United States Patent
Booth et al.

(10) Patent No.: US 7,241,131 B1
(45) Date of Patent: Jul. 10, 2007

(54) THICK FILM HEATER APPARATUS

(75) Inventors: Andrew Booth, Williston, VT (US); Harold Warren, Sugar Grove, NC (US); Wink Winkelmann, Boonb, NC (US); Edward Jenko, Essey Junction, VT (US); Jim Pilavdzic, Milton, VT (US)

(73) Assignee: Husky Injection Molding Systems Ltd. (CA)

( * ) Notice: Subject to any disclaimer, the term of this patent is extended or adjusted under 35 U.S.C. 154(b) by 0 days.

(21) Appl. No.: 09/596,549

(22) Filed: Jun. 19, 2000

(51) Int. Cl.
*B29C 45/74* (2006.01)
*H05B 3/16* (2006.01)

(52) U.S. Cl. .................. 425/549; 425/186; 425/192 R; 425/547; 425/DIG. 13; 219/543; 338/309; 392/480

(58) Field of Classification Search ................ 425/547, 425/549, DIG. 13, 185, 186, 192 R; 264/328.15; 219/543; 338/307, 308, 309; 392/480, 473
See application file for complete search history.

(56) References Cited

U.S. PATENT DOCUMENTS

| | | | |
|---|---|---|---|
| 2,979,773 A | 4/1961 | Bolstad | 18/34 |
| 3,970,821 A | 7/1976 | Crandell | 219/523 |
| 4,120,086 A | 10/1978 | Crandell | 29/611 |
| 4,132,971 A | 1/1979 | Caddock, Jr. | 338/61 |
| 4,203,197 A | 5/1980 | Crandell | 29/611 |
| 4,273,525 A | 6/1981 | Reitan | 425/549 |
| 4,304,544 A * | 12/1981 | Crandell | 425/549 |
| 4,310,401 A | 1/1982 | Stahl | 204/195 S |
| 4,390,485 A | 6/1983 | Yang | 264/25 |
| 4,396,899 A | 8/1983 | Ohno | 338/34 |
| 4,455,744 A | 6/1984 | Zandman | 29/610 R |
| 4,485,387 A | 11/1984 | Drumheller | 346/140 R |
| 4,510,036 A | 4/1985 | Takeuchi et al. | 204/425 |
| 4,514,160 A | 4/1985 | Davidsmeyer | 425/143 |
| 4,557,685 A | 12/1985 | Gellert | 425/549 |
| 4,570,150 A | 2/1986 | Zandman et al. | 338/329 |
| 4,583,284 A | 4/1986 | Gellert | 29/611 |
| 4,641,423 A | 2/1987 | Crandell | 29/611 |

(Continued)

FOREIGN PATENT DOCUMENTS

DE    199 41 038 A 1    8/1999

(Continued)

OTHER PUBLICATIONS

PCT International Search Report (Four pages) File Reference H-525-0-WO; International Application No. PCT/CA 01/00507; International Filing Date: Dec. 4, 2001; Earliest Priority Date: Jun. 19, 2000.

*Primary Examiner*—Yogendra N. Gupta
*Assistant Examiner*—Emmanuel S. Luk
(74) *Attorney, Agent, or Firm*—Katten Muchin Rosenman LLP

(57) ABSTRACT

A thick-film electric heater having thick-film layers applied directly on a thermally conductive non-flat substrate. Preferably, the substrate is cylindrically shaped. A dielectric layer is silk-screened on the substrate surface. A resistive layer is silk-screened on the dielectric layer to form a circuit for the generation of heat. The resistive layer has at least one resistive trace in a pattern that is discontinuous circumferentially. At least a pair of silk-screened contact pads are applied in electrical communication with the resistive layer for electrical connection to a power source. An insulation layer is applied over the resistive layer.

25 Claims, 7 Drawing Sheets

U.S. PATENT DOCUMENTS

| | | | |
|---|---|---|---|
| 4,659,906 A | 4/1987 | Furtek | 219/345 |
| 4,739,657 A | 4/1988 | Higashi et al. | 73/204 |
| 4,768,283 A | 9/1988 | Gellert | 29/611 |
| 4,782,708 A | 11/1988 | Harrington et al. | 73/861.05 |
| 4,787,836 A * | 11/1988 | Osuna-Diaz et al. | 425/190 |
| 4,795,126 A | 1/1989 | Crandell | 249/78 |
| 4,859,981 A | 8/1989 | Peschl | 338/308 |
| 4,882,203 A | 11/1989 | Witmer | 427/124 |
| 4,897,028 A | 1/1990 | Barancik et al. | 425/144 |
| 4,899,435 A | 2/1990 | Trakas | 29/611 |
| 4,902,610 A * | 2/1990 | Shipley | 430/312 |
| 4,911,636 A | 3/1990 | Gellert | 425/549 |
| 4,922,082 A | 5/1990 | Bredt et al. | 219/541 |
| 4,964,795 A | 10/1990 | Tooman | 425/144 |
| 5,007,818 A | 4/1991 | Barancik et al. | 425/144 |
| 5,046,942 A | 9/1991 | Gellert | 425/549 |
| 5,051,086 A | 9/1991 | Gellert | 425/549 |
| 5,052,100 A * | 10/1991 | Trakas | 29/611 |
| 5,085,572 A | 2/1992 | Leverenz | 425/549 |
| 5,112,025 A | 5/1992 | Nakayama et al. | 249/115 |
| 5,155,340 A | 10/1992 | Morita et al. | 219/543 |
| 5,176,839 A * | 1/1993 | Kim | 249/78 |
| 5,215,597 A | 6/1993 | Kreider | 136/225 |
| 5,226,596 A | 7/1993 | Okamura | 239/1 |
| 5,234,637 A | 8/1993 | Reymann et al. | 264/40.6 |
| 5,320,513 A | 6/1994 | Schmidt | 425/143 |
| 5,334,006 A * | 8/1994 | Hepler et al. | 425/190 |
| 5,360,333 A * | 11/1994 | Schmidt | 425/549 |
| 5,408,070 A * | 4/1995 | Hyllberg | 219/469 |
| 5,411,392 A | 5/1995 | Von Buren | 425/549 |
| 5,421,715 A | 6/1995 | Hofstetter et al. | 425/547 |
| 5,456,592 A | 10/1995 | Shindo | 425/549 |
| 5,468,141 A | 11/1995 | Iwami et al. | 425/542 |
| 5,470,219 A | 11/1995 | Yokoyama et al. | 425/144 |
| 5,504,304 A | 4/1996 | Noguchi et al. | 219/426 |
| 5,518,389 A | 5/1996 | Nonomura et al. | 425/144 |
| 5,521,357 A | 5/1996 | Lock et al. | 219/543 |
| 5,521,576 A * | 5/1996 | Collins | 338/307 |
| 5,527,177 A | 6/1996 | Potter | 425/190 |
| 5,536,164 A | 7/1996 | Brun, Jr. et al. | 425/547 |
| 5,548,268 A * | 8/1996 | Collins | 338/307 |
| 5,561,296 A | 10/1996 | Goto | 250/352 |
| 5,569,398 A | 10/1996 | Sun et al. | 219/121.68 |
| 5,569,474 A | 10/1996 | Kitaichi et al. | 425/547 |
| 5,573,692 A | 11/1996 | Das et al. | 219/543 |
| 5,632,078 A | 5/1997 | Potter | 29/611 |
| 5,641,421 A | 6/1997 | Manov et al. | 219/553 |
| 5,653,932 A | 8/1997 | Aida et al. | 264/219 |
| 5,702,653 A * | 12/1997 | Riley | 264/61 |
| 5,705,793 A | 1/1998 | Kitaichi et al. | 219/544 |
| 5,859,411 A * | 1/1999 | Bresolin et al. | 219/523 |
| 5,895,591 A | 4/1999 | Kojima et al. | 219/209 |
| 5,916,467 A | 6/1999 | Shimada | 219/543 |
| 5,973,296 A * | 10/1999 | Juliano et al. | 219/424 |
| 6,025,577 A * | 2/2000 | Schwarzkopf | 219/535 |
| 6,163,016 A * | 12/2000 | Johnson et al. | 219/424 |
| 6,211,030 B1 * | 4/2001 | Liou | 438/382 |
| 6,222,166 B1 * | 4/2001 | Lin et al. | 219/538 |
| 6,305,923 B1 | 10/2001 | Godwin et al. | |
| 6,341,954 B1 * | 1/2002 | Godwin et al. | 425/549 |
| 6,575,729 B2 | 6/2003 | Godwin et al. | |
| 6,764,297 B2 | 7/2004 | Godwin et al. | |
| 2001/0036504 A1 * | 11/2001 | Bottari et al. | 427/162 |

FOREIGN PATENT DOCUMENTS

| | | |
|---|---|---|
| EP | 0 312 029 B1 | 12/1988 |
| EP | 0312029 B1 | 5/1994 |
| EP | 0 963 829 A 1 | 8/1999 |
| JP | 55067417 A | 5/1980 |

\* cited by examiner

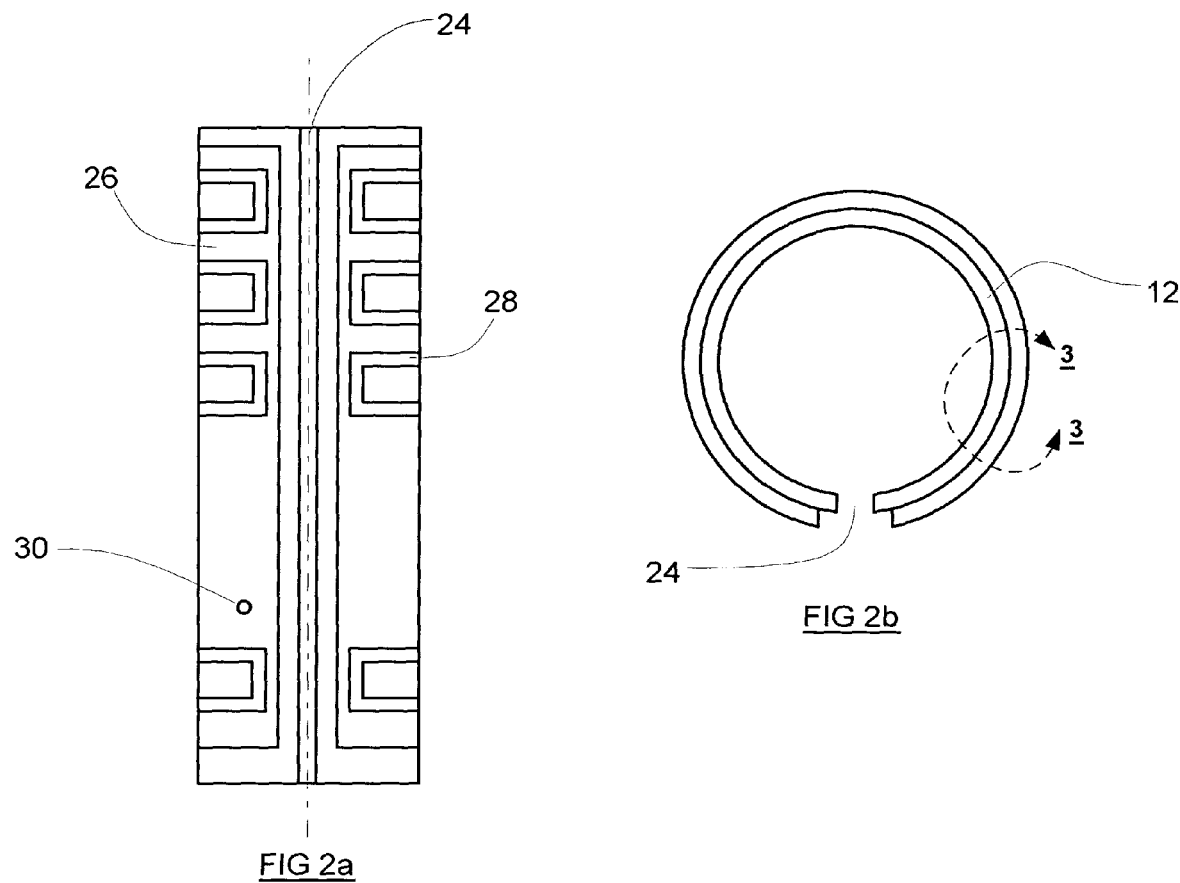
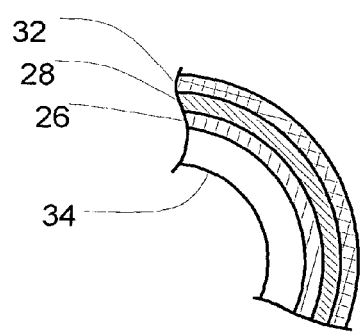

THICK FILM HEATER APPARATUS

BACKGROUND OF THE INVENTION

1. Field of the Invention

The invention relates to injection molding systems and specifically to a heater for hot runner nozzles for such systems.

2. Related Prior Art

Common to all devices for processing thermoplastic polymeric resins are associated means for obtaining and maintaining thermoplasticity of the resin during processing, such as the shaping of the resin material into an article. Maintenance of thermoplasticity may require both heating and cooling of the resin at various times in the processing of the resin. Cooling may be needed to avoid thermal degradation of the resin. Almost all of the resin processing techniques rely at least in part on heating or cooling of the polymeric resin by thermal transfer through the agency of a metal surface, part of the processing apparatus. Heat is generally applied to an outside surface of the metal apparatus by concentrated heat sources such as band heaters, or from within the body of the metal part by heater rods or circulating, heated fluids such as air, water or other chemical liquids. In all cases, the metal heat transferring components have to be of substantial thickness and mass to resist extreme pressures and mechanical forces. The large metal mass responds slowly to changes in thermal input or cooling so that precise control of narrow temperature ranges is difficult to control. Also, when temperature differences are desired in adjacent zones of the same apparatus, it is difficult to localize the particular and different temperatures to be maintained for appreciable periods of time. This shortcoming is especially troublesome for relatively complex processing techniques and apparatus, such as in the injection molding of large parts.

Hot runner injection molding systems have several melted material flow passageways that are uniformly heated over the entire flow path leading from a molten reservoir to a mold cavity or cold runner. The melted material that flows through the passageway must remain liquid until reaching the mold cavity or cold runner. To control flow rate and pressure, the heated passageway leads to or from injection mold runner nozzles which may be externally heated. This nozzle is sometimes referred to as a hot runner gate injection nozzle or a hot runner probe injection nozzle but will hereafter be simply referred to as a "runner nozzle." These runner nozzles are typically located in the hot runner molding system's manifold base. The nozzles extend through ports leading to each of the molding cavities or to a secondary heated or unheated passageway within a mold block. It is essential to adequately and uniformly heat the runner nozzle because this is often the final point in the heated portion of the flow passageway just prior to being injected into the mold. At this point the material must be at or above its melting point in order for the molten material to flow freely through the runner nozzle, so the nozzle can reliably perform its function of controlling flow rate.

Significant transitions in temperature at the point of the runner nozzle are not desirable as the nozzle is a key part of any molding process because transitions in temperature may change the fluid consistency of the melted material such as thermoplastic which may result in a defective final product. Also, if it is desired to intermittently shut off flow and turn flow back on for a given nozzle, heating of the nozzle is necessary to maintain the residual material in a melted state, to prevent clogging.

Currently, runner nozzles are typically heated by a heat source external to the nozzle. Typically, the runner nozzle is heated by a resistive wire proportionally spirally wound heating element. The spirally wound element forms a cylinder that is co-axially disposed about the exterior surface of the runner nozzle. However this type of heater configuration operates inefficiently due to heat loss because of the open exposure of the heating element to the surrounding environment. It also increases the diameter of the nozzle and thus requires bigger openings in the manifold plate to receive the nozzle. Also, many of the standard nozzle heaters are not completely encapsulated by an insulated sheath, which make it more difficult to maintain a temperature at the runner nozzle location that is uniform with the remainder of the flow passageway. In addition the physical design of the resistive element (i.e. spiral) is limited as well. The gauge of the resistive wire heating element required to generate enough heat is such that the wire cannot be formed into complex circuit patterns. In many cases various complex circuit patterns other than a simple spiral pattern are desired in order to achieve more efficient heat distribution. Also, these types of heaters can be bulky and difficult to maintain and repair. Installation is difficult because of the large leads of the resistive element, and the mold designer must allocate space for the large leads and increased nozzle/heater combination. In addition, in many cases the externally heated runner nozzle apparatus has to be adapted to accommodate a thermocouple device which requires an additional space for the thermocouple and its wiring. A better way is needed to uniformly heat the runner nozzle, heat it efficiently and the design should be cost effective and easy to maintain and repair.

Conventional industrial equipment which provides heat externally to a flow passage, such as the subject runner nozzle, will generally provide heat by the means described above or by a single or multiple band heater design.

In U.S. Pat. No. 5,973,296 to Juliano, et al., the invention is a tubular heater that consists of a metallic tubular substrate that has a dielectric film layer and a resistive thick film layer applied directly to the exterior cylindrical surface of a tubular substrate by the method of precision fine film printing. This method is similar to the method used to produce some thick-film resistors. The precision fine film printing requires the use of an expensive fine film printing machine that uses a fine tip writing pen to dispense the conductive ink.

U.S. Pat. No. 5,411,392 to Von Buren, teaches a slotted band heater in conjunction with a slotted clamping sleeve that installs over a hot runner nozzle. This two part device utilizes the clamping force of the outer sleeve to maintain thermal communication between the band heater and the nozzle.

In U.S. Pat. No. 4,922,082 to Bredt et al., an electrical resistive heating device which comprises two co-axially spaced apart electrodes, each in intimate surface-to-surface contact with an interposed heating element is disclosed. The heating element comprises a powdered material which functions as an electrical resistive heater when an electrical potential difference is applied thereacross by the electrodes. Heat generated in such element is conducted through at least one of the electrodes which in turn conducts it to an object which it is desired to heat. The powdered material is pressed in the annular space between the two electrodes.

A new heating device is needed that can be easily installed over a runner nozzle or other conduit and be readily massed produced, reliable, provide repeatable and predictable temperature profiles at a reduced manufacturing and maintenance cost.

The improved apparatus of the present invention includes as a heater means a multi-layer thick-film heater which may be mounted in close association with the thermoplastic polymeric resins being processed in the apparatus. Heavy metal components to achieve thermal transfer to the resin are not necessary. There can be a saving of weight, materials and labor in manufacture. With the closer juxtaposition of the heating element in the subject plastic, a closer control of resin temperature is maintainable with quicker response times to maintain a pre-determined resin temperature, even in adjacent but different zones or localities. The lower thermal mass of the heating elements is more responsive to cooling or changes from heating to cooling or cooling to heating. A more accurate and repeatable temperature profile can be obtained with the device resulting in improved machine performance and a higher quality finished product.

SUMMARY OF THE INVENTION

The primary objective of the invention is to provide an improved heater apparatus for use in the processing of molten material.

Another aspect of the invention is to provide a substantially thin tube like heater device that can be easily installed on a typical hot runner nozzle with a reduced overall diameter of the nozzle which allows for a reduction in the spacing between nozzles.

A further aspect of the invention is to provide a heater that is lower in cost to manufacture and maintain.

Yet another aspect of the invention is to provide a heater that is suitable for mass production quantities through the use of the silk-screening process.

Another aspect of the invention is to provide a thick-film heater with a unique slip-on and slip-off electrical connector feature that can survive the high temperatures and thermal expansion difficulties inherent in an injection molding machine.

Yet another aspect of the invention is to provide a more reliable heater that also exhibits a more stable and repeatable temperature profile over its usable life.

Still another aspect of the present invention is to provide a heater that can provide an optimized and precise temperature profile along its length.

Yet another aspect of the present invention is to provide a heater with a multi-layer resistive trace that increases the heater output for a given size heater substrate.

The foregoing aspects are achieved by the installation of the present invention in an injection molding machine, particularly on the hot runner nozzle system. These are merely some of the innumerable aspects of the present invention and should not be deemed an all-inclusive listing of the innumerable aspects associated with the present invention. These and other aspects will become apparent to those skilled in the art in light of the following disclosure and accompanying drawings. The present invention includes a cylindrically shaped metal substrate with a silk screened dielectric layer applied thereon. Silk screened or otherwise printed on the dielectric layer is a resistive layer which comprises a predetermined trace pattern with two ends, the pattern of the trace determines the temperature profile along the length of the heater. The resistive trace could comprise multiple layers of resistive material connected serially to increase the heater capacity. Silk screened in communication with the two terminal ends of the resistive trace pattern are electrical contact pads which are designed to interface with a pair of electrical conductors for communication of an electrical current therethrough. Silk screened over the resistive trace pattern is an insulation layer that protects the resistive layer from abrasion and electrical shorting. The insulation layer could further be formulated to act as a thermal insulator to decrease thermal losses from the outer surface of the heater. The insulation layer is not placed over the electrical contacts. The electrical conductors are placed and rigidly affixed to the electrical contact pads by the use of a removable connector sleeve that slips over the outside diameter of the heater and over the contact pads. There is no welding, brazing or soldering of the conductors to the contact pads. Contact at this interface is maintained by the wedging action and pressure created by the connector sleeve.

BRIEF DESCRIPTION OF THE DRAWINGS

FIG. 2*a* is a plan view of a preferred embodiment with the connector sleeve removed for clarity;

FIG. 2*b* is a simplified cross sectional view of a preferred embodiment;

FIG. 3 is a cross sectional detailed view of the various layers of a preferred embodiment;

REFERENCE NUMERALS USED IN THE DRAWINGS

8—hot runner nozzle assembly
10—preferred embodiment
12—heater assembly
14—nozzle body
16—channel
18—connector sleeve assembly
20—nozzle tip
22—conductor
24—slot
26—dielectric layer
28—resistive layer
30—locating hole
32—insulation layer
34—substrate
35—detent groove
36—connector housing
37—first contact groove
38—locking detent assembly
39—second contact groove
40—contact
42—key
44—detent pin 46—detent spring
48—low resistance conductive trace
50—resistive trace
52—contact pads
54—passageway
55—wound cable heater temperature profile
58—copper sleeve heater temperature profile
60—optimized computer temperature profile
62—preferred embodiment temperature profile

DETAILED DESCRIPTION OF THE
PREFERRED EMBODIMENTS

Figure 1:
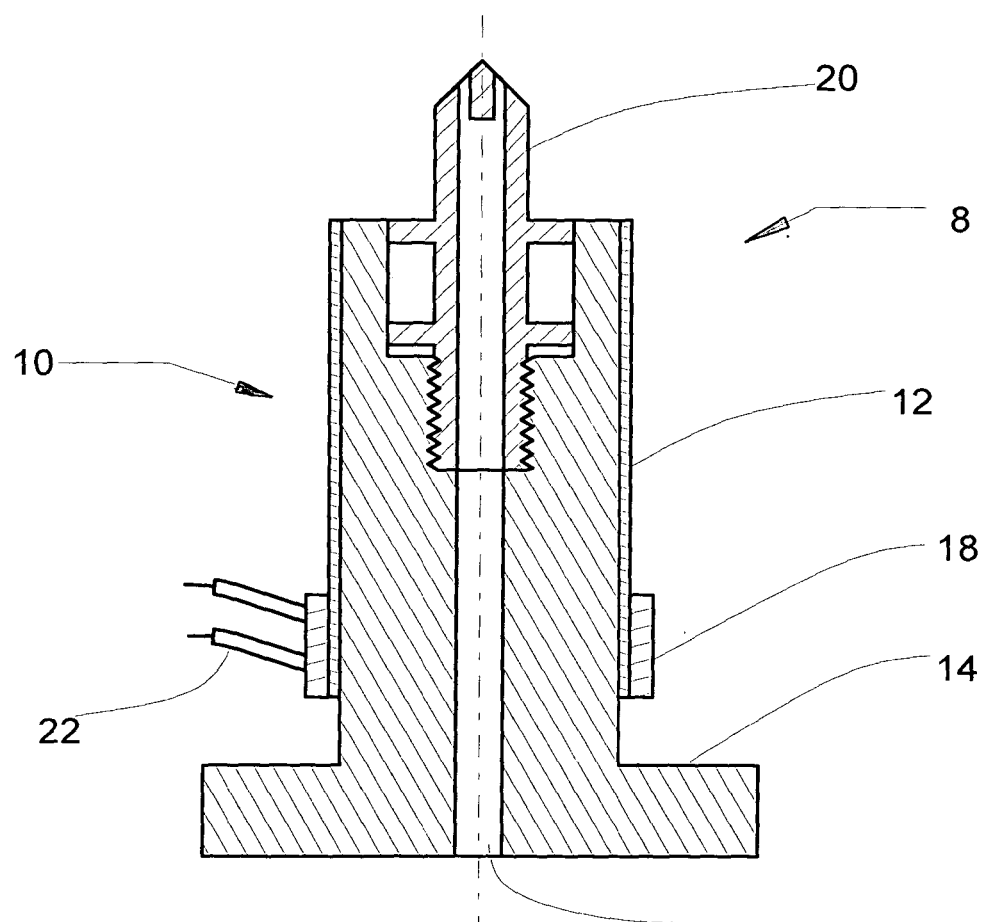
FIG. 1 is a cross sectional view of the preferred embodiment installed on a typical hot runner nozzle assembly.
Figure 2C:
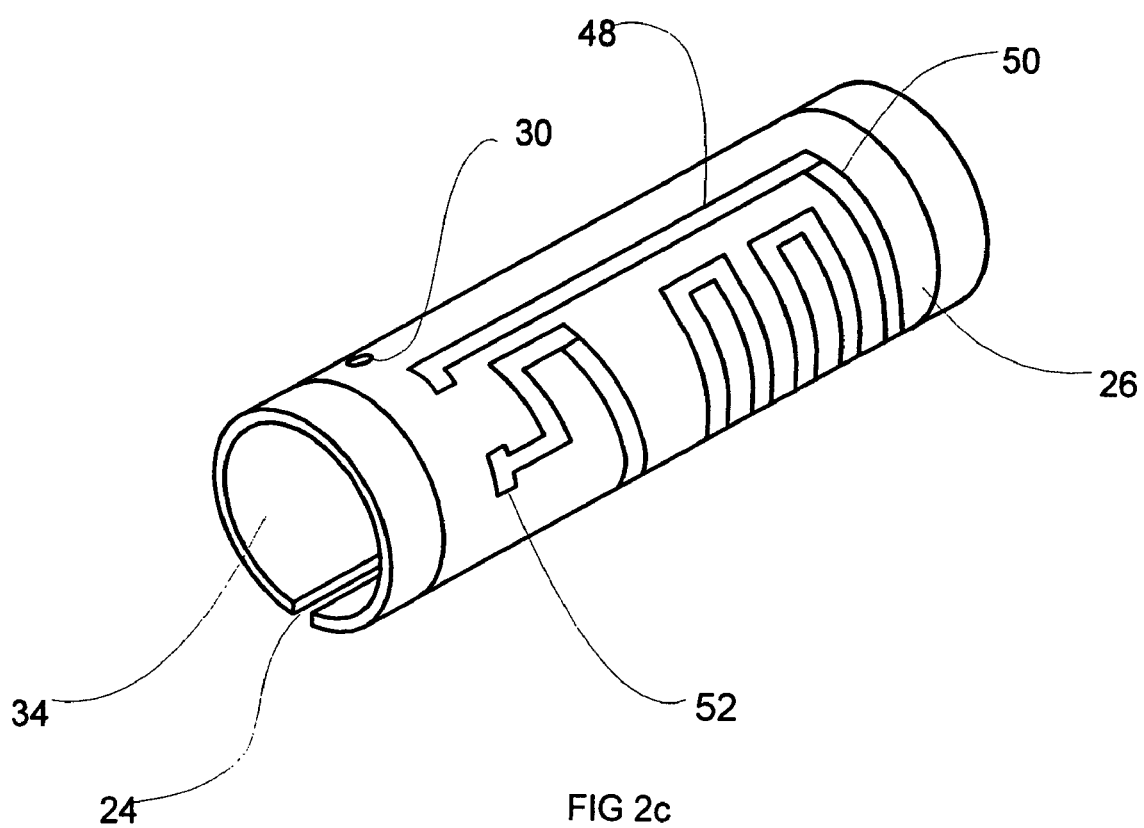
FIG. 2*c* is an isometric view of a preferred embodiment with the connector sleeve removed for clarity.

Referring to FIG. 1, a typical hot runner nozzle assembly 8 is shown. The hot runner nozzle assembly 8 comprises a nozzle body 14, a channel 16, a nozzle tip 20, a heater assembly 12, a connector sleeve assembly 18 and at least a pair of conductors 22. The channel 16 runs the length of the nozzle body 14 and communicates with the nozzle tip 20 for transfer of molten material to a mold cavity (not shown). Placed in thermal communication with the nozzle body 14 is the heater assembly 12 which maintains the material in channel 16 in a free flowing molten state. The connector sleeve assembly 18 is slidably installed over the heater assembly 12 and rigidly affixes the conductors 22 with the heater assembly 12 for communication of electrical current therethrough.

Referring now to FIGS. 2a, 2b, 2c, and FIG. 3, the heater assembly 12 is shown. The heater assembly 12 comprises an optional slot 24, a locating hole 30, a substrate 34, a thick-film dielectric layer 26, a thick-film resistive layer 28, at least a pair of contact pads 52 and an insulation layer 32. The heater assembly 12 comprises various layers of different materials. The substrate 34 in the preferred embodiment is a C-shaped piece of metal, typically made from steel or other thermally conductive material. The optional slot 24 runs the length of the heater and allows the substrate to act as a self clamping spring when installed around the nozzle body 14. In the preferred embodiment the substrate 34 is made from 430 stainless steel machined from solid bar or tube to have approximately 0.020" to 0.040" thick cylindrical wall.

The inner diameter of the substrate 34 is sized smaller than the outside diameter of the hot runner nozzle. This configuration provides good thermal communication between the heater assembly 12 and the nozzle body 14. As mentioned previously, in the preferred embodiment the substrate 34 is made from type 340 or 430 stainless steel which has substantially the same or optionally slightly lower thermal coefficient of expansion as the thick-film layers that are applied thereon. Alternatively, the substrate could be made from a ceramic composite material formulated to provide a particular thermal coefficient of expansion. Matching the thermal coefficient of expansion is essential to prevent cracking in the layers as the elements start to expand during heating. If the substrate were to expand more than the thick-film layers, the thick-film layers would start to crack and may cause the resistive layer 28 to short out prematurely. In addition, the coefficient of thermal expansion for the substrate 34 is lower than that of the nozzle body 14. As a result, as the nozzle body 14 heats up, it expands quicker than the substrate 34 and a natural clamping force is built up between the heater assembly 12 and nozzle body 14, resulting in improved thermal communication.

Referring to FIG. 3, the thick-film dielectric layer 26 is applied to the outer surface of the substrate 34, with the preferred embodiment using a silk-screen type process. The silk-screen process is preferable because it greatly reduces the production time of a specific heater design. The silk-screen process requires the use of a single mask for the dielectric layer, and the silk-screen process is well suited for high speed processing. In the preferred embodiment, the dielectric layer is made from a ceramic-glass mixture and provides electrical insulation between the substrate 34 and the resistive layer 28. The dielectric layer 26 is applied to the outside of the substrate 34 and then cured in an oven at 850° C. In the preferred embodiment the dielectric layer 26 has a minimum dielectric strength between 1000-1500 VAC and an insulation resistance greater than 100 mega-ohms. To achieve this dielectric strength usually requires the application of at least three successive thick-film layers of the dielectric material.

The term "thick-film" is used in the art to describe materials that are on the order of 0.001" thick after firing. As opposed to "thin-film" which is used in the art to describe much thinner materials on the order of 0.00025" thick. Thick-film materials are typically applied as a paste or ink and fired using a precise thermal profile. Thick-film materials may be applied using either silk-screen or direct write technologies. Thick-film ink comprises a finely ground suspension of ceramics or glass matrix with varying combinations of conductor and resistive materials. Thick-film ink can easily be formulated to be used as a conductor, resistor or insulator.

Figure 9:
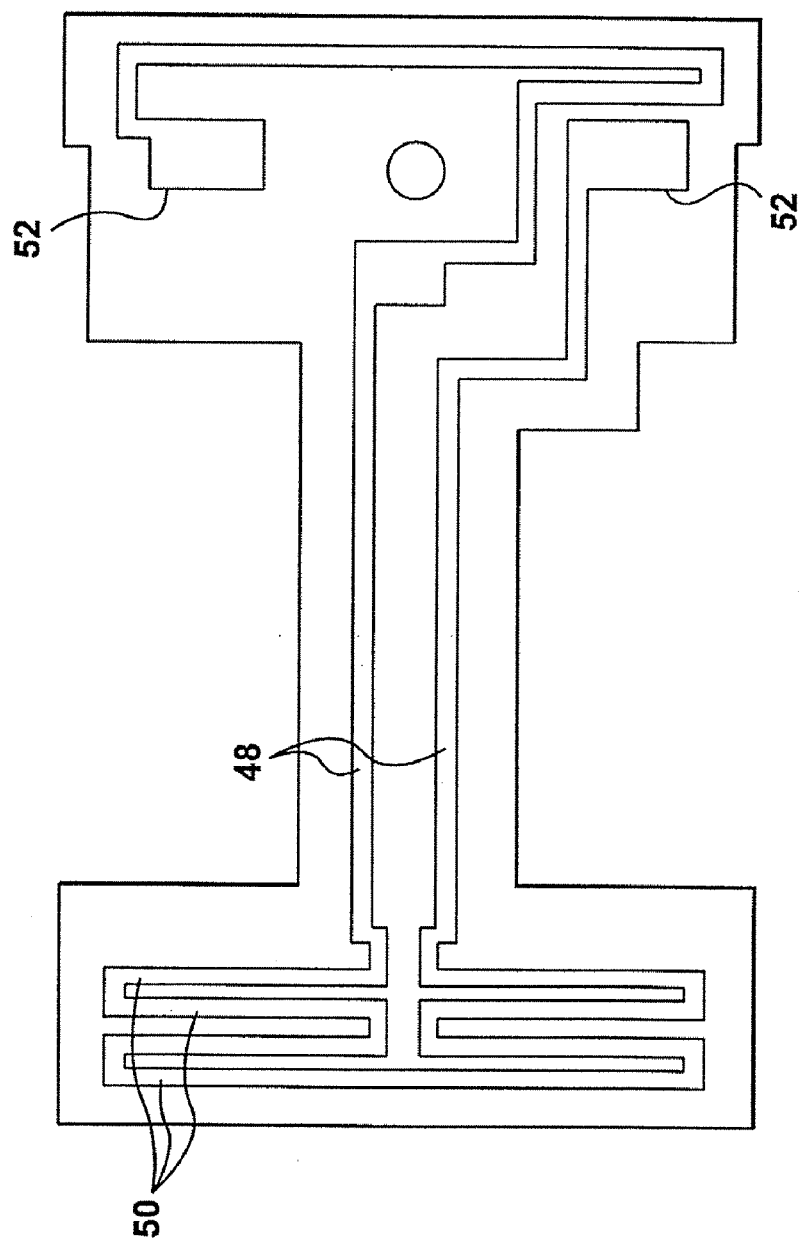
FIG. 9 is a flat layout of the thick film resistive/conductive trace pattern.

Applied over the dielectric layer in a predetermined trace pattern is the thick-film resistive layer 28. The resistive layer 28 is essentially the electrical circuit that generates heat through ohmic losses within the trace. Referring to FIG. 9, which shows a preferred embodiment of a flat pattern of the resistive layer 28, the resistive layer 28 is made from both a resistive trace 50 and a low resistance conductive trace 48. Heat is generated mostly from the resistive trace 50, thereby applying heat at very precise and controlled locations along the heater assembly 12. The conductive trace 48 is made of very low electrically-resistive material to minimize ohmic losses.

In the preferred embodiment, both the resistive trace 50 and the conductive trace 48 is applied to the dielectric layer 26 using a silk-screen process. Alternatively, the resistive trace could be applied using a direct write method utilizing a special printer. A direct write method is preferable in small lot production environments where economies of scale are not realized. Again, the silk-screen process is preferable due to lower manufacturing cost for large volume applications. The conductive trace 48 is made from a palladium silver matrix that typically exhibits a resistance on the order of 0.01 ohms/square. The conductive trace 48 is applied before the resistive trace 50 because the conductive trace is fired at approximately 825° C., and the resistive trace 50 is fired at approximately 800° C. Following the firing of the conductive trace 48, the resistive trace 50 is applied using the silk-screen process. As mentioned previously this trace is then fired at approximately 800° C.

The patterning of the resistive layer 28 is a key advantage of the present invention. Thermal profiling is a key design element in hot runner nozzle construction. The repeatability and high watt density available with the present invention allows for an optimized thermal profile which will help to eliminate troublesome hot spots in hot runner nozzles. The trace pattern used on the preferred embodiment can easily be modified based on computer thermal analysis to provide the heat exactly where it is needed. In the preferred embodiment, watt densities on the order of 100 Watts per cubic centimeter have been achieved.

During the formation of the conductive trace 48, at least two contact pads 52 are formed from the same material. The contact pads 52 in the preferred embodiment are located at each end of the resistive layer 28 and provide a place to apply electrical power to the heater assembly 12. The contact pads 52 are located in a predetermined position on the heater assembly 12 for interface with the connector sleeve assembly 18 when the sleeve is fully installed and locked in place.

Applied over the resistive layer 28 is the insulation layer 32 also using a silk-screen process. The insulation layer 32 is not applied over the contact pads 52. The insulation layer 32 is a mechanical, thermal and electrical insulative substance that protects the resistive layer 28 from abrasion and electrical shorts and reduces heat loss from the outside surface of the heater. The insulation layer 32 comprises a glass matrix which is fired at a temperature of approximately 600° C.

Figure 4:
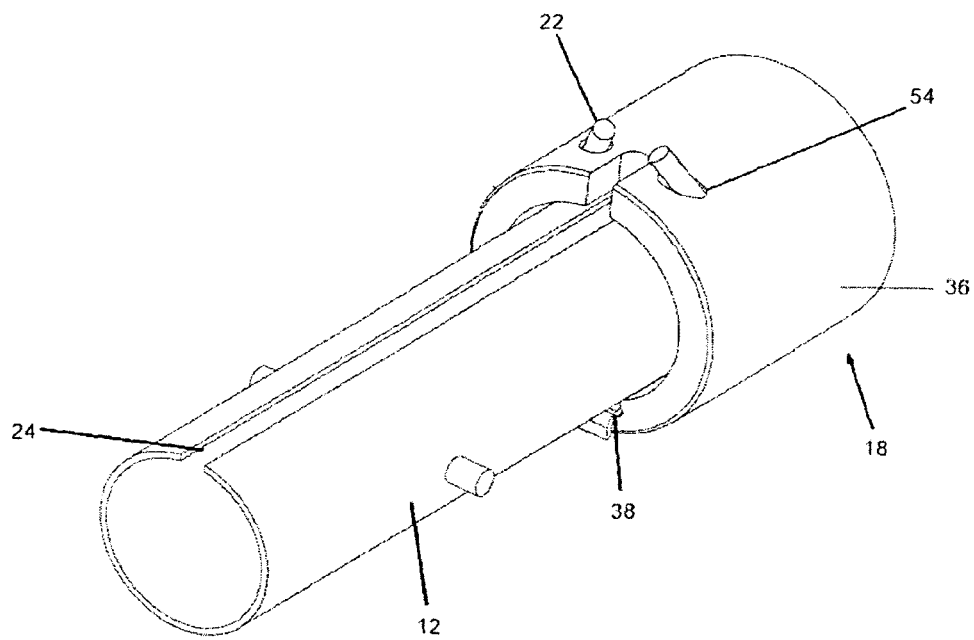
FIG. 4 is a simplified isometric view of the connector sleeve installed on the heater.
Figure 5:
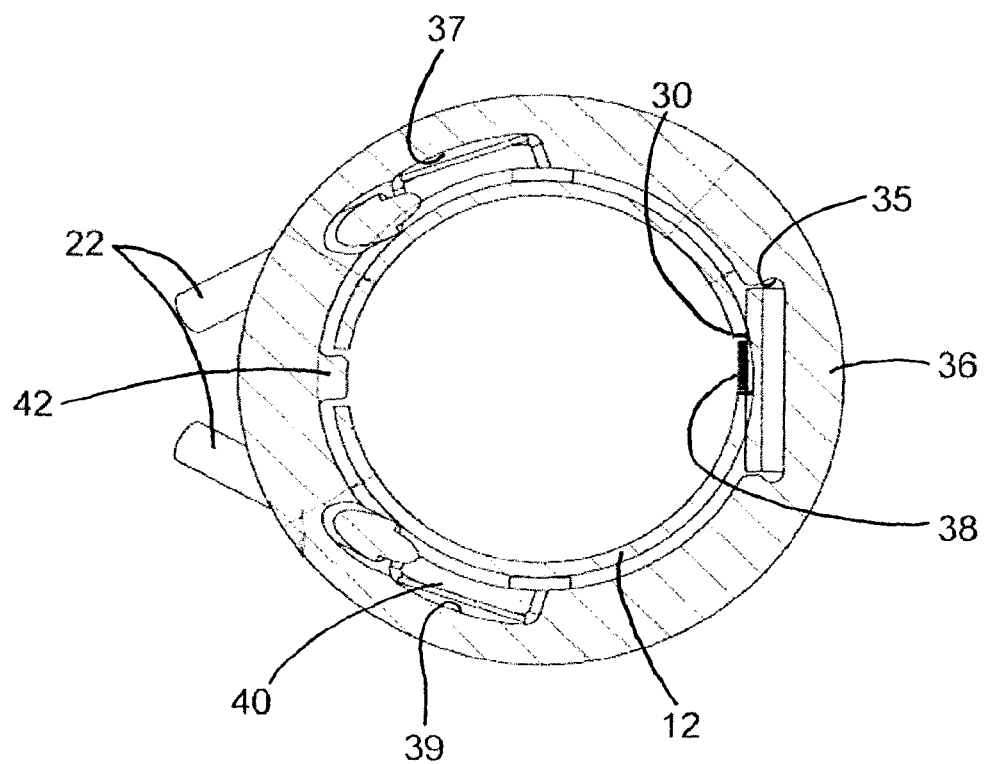
FIG. 5 is a cross sectional view of the connector sleeve installed in the heater.

Referring to FIG. 4 and FIG. 5, the connector sleeve 18 is shown installed on the heater assembly 12. The connector sleeve assembly 18 comprises a connector housing 36, electrical spring contacts 40, electrical conductors 22, passageways 54, a detent groove 35, a first and second contact groove 37 and 39 respectively, and a locking detent assembly 38.

The connector housing 36 is an annular shaped plug that will slidably engage the outside diameter of the heater assembly 12. A key 42 on the inside diameter of the housing 36 interfaces with the slot 24 and properly aligns the sleeve assembly 18 with the contact pads 52. The first and second contact grooves 37 and 39 are formed on the inside surface of the connector housing 36 for the insertion of spring contacts 40. The passageways 54 allow for the installation of the conductors 22 through the wall of the housing 36 for connection to the contacts 40.

The connector housing 36 in the preferred embodiment is made from a pressed and fired 96% dense alumina ceramic material. This material currently offers properties that are best suited for high temperature environments and exhibits electrical and thermal insulative properties. It could however be easily manufactured from any suitable material that possesses high dielectric properties and low thermal conductivity.

The electrical spring contacts 40 are used to transmit electrical energy from the conductors 22 to the contact pads 52 on the surface of the heater assembly 12. The spring contacts 40 must be compliant to compensate for the thermal expansion, corrosion resistant and able to withstand a temperature of 425° C. continuously without degradation while maintaining a low resistance connection. In the preferred embodiment, the material for the spring contact 40 is made from full hard stainless steel, preferably type 301. The contact surface of the spring contact 40 may be gold plated to improve corrosion resistance and reduce contact resistance.

Figure 7:
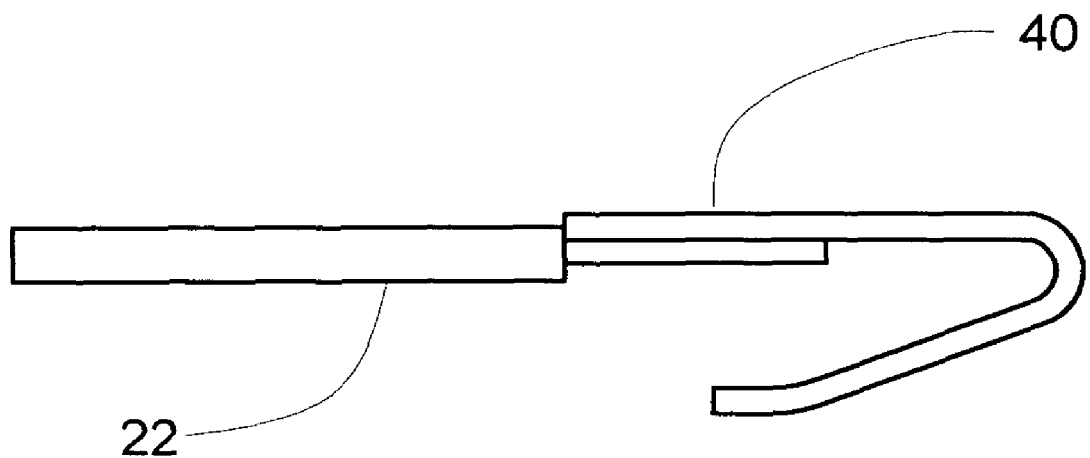
FIG. 7 is a plan view of the electrical connector assembly.

Referring to FIG. 7, the spring contact 40 is welded to the conductor 22. In the preferred embodiment, the conductor 22 is resistance welded to the contact 40 because it reduces the heat transmitted to the wire and requires no fluxing or filler material. This type of connection is also able to withstand the high temperature molding process. In the preferred embodiment a high temperature wire is used with a teflon or fiberglass insulator applied.

Figure 8:
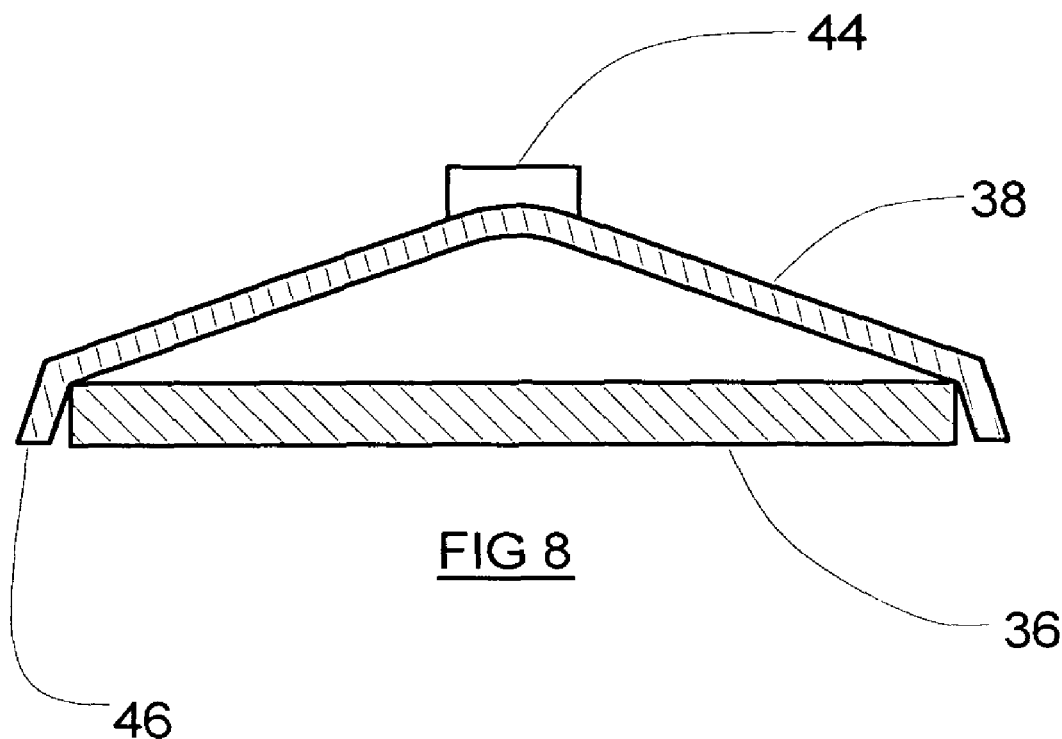
FIG. 8 is a cross sectional view of the locking detent assembly.

Referring to FIG. 4, FIG. 5 and FIG. 8, the locking detent assembly 38 is shown. The detent assembly 38 is inserted in the detent groove 35. The detent groove 35 runs the length of the housing 36, and is wide enough to fully seat the detent assembly 38. The detent assembly 38 comprises a detent spring 46 and a detent pin 44. When the housing 36 is installed on the heater assembly 12, the detent pin 44 is aligned and communicates with the locating hole 30. This alignment automatically occurs when the key 42 engages the slot 24 of the heater assembly 12. The detent spring 46 is made from a sheet material that exhibits spring like characteristics that can withstand the high temperatures of the molding process. In the preferred embodiment the detent spring 46 is made from type 301 stainless steel. As the connector sleeve assembly 18 is slid down the heater assembly 12, the detent pin 44 is sized to engage the locating hole 30 and effectively locks the connector sleeve assembly 18 onto the heater assembly 12 in the proper location and insures the alignment and communication of electrical current through the spring contacts 40 and the contact pads 52.

Figure 6:
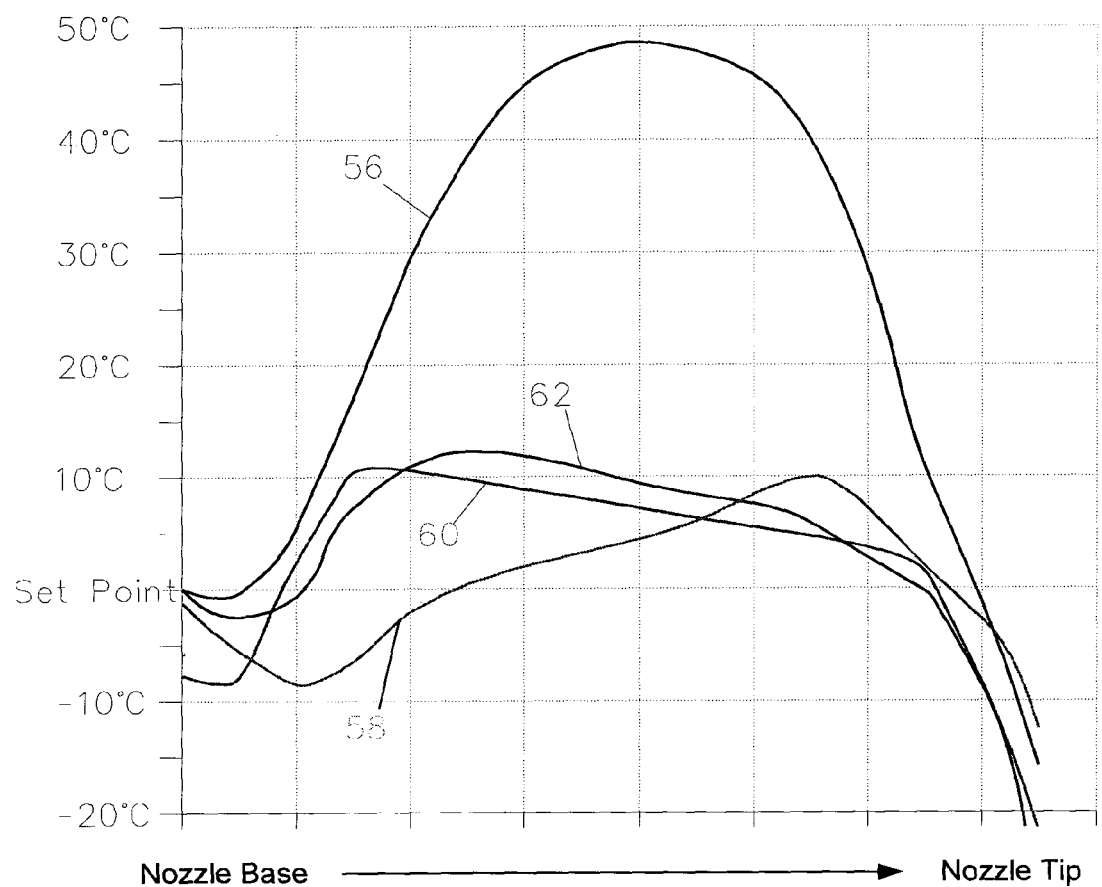
FIG. 6 is a graph of the temperature profile along the length of a hot runner nozzle showing the prior art as well as a preferred embodiment of the invention.

As mentioned previously, the ability to provide an optimized resistive trace 50 based on a computer analysis is a major advantage of this invention. Referring to FIG. 6, a graph is shown that compares the various temperature profiles along the length of the nozzle body based on various heater technologies. A wound cable heater profile 56 shows how hot spots can be generated in the nozzle. This type of heater quickly creates a hot spot in the center portion of the nozzle body and can degrade the quality of the molten material. Also shown is a copper sleeve heater temperature profile 55. Again, this type of heater, while better than a wound cable heater, still exhibits hot and cold spots that can degrade the quality of the molten material. An optimized computer model trace 60 is shown that shows the best temperature profile for processing molten material in a hot runner nozzle. With the present invention, the resistive trace 50 was designed to approach this optimized performance. Curve 62 shows the actual measured performance of the optimized heater design of the present invention. This temperature profile comes close to the optimized computer model and will result in improved performance of the molding process.

The present invention may effectively be employed on any channel means from a source of molten plastic. One skilled in the art could easily utilize the present invention on different processing machines that require the application of heat in specific areas of the machine for continued processing of material therein. The present invention could easily be employed on hot runner channels within a manifold or on a sprue bar or on an injection machine plastisizing screw housing for example.

Thus the assembly of the present invention is easy to install, has a low profile enabling more compact design possibilities, provides a controllable and optimized heat profile and represents a lower cost heater solution with efficient heat exchange capabilities.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A thick-film electric heater, comprising:
   a) a thermally conductive non-flat substrate surface;
   b) a silk-screened dielectric layer applied on said substrate surface;
   c) a resistive layer applied on said dielectric layer thereby forming a circuit for the generation of heat, the resistive layer having at least one resistive trace made of thick film ink in a pattern that is discontinuous circumferentially;

d) at least a pair of silk-screened contact pads applied in electrical communication with said resistive layer for electrical connection to a power source;

e) an insulation layer applied over said resistive layer; and f) wherein the thermally conductive non-flat substrate surface has a thermal coefficient of expansion substantially the same or slightly lower than the dielectric and resistive layers.

2. The heater of claim 1, further comprising a connector housing for connection of a contact to each of said contact pads.

3. The heater of claim 1, where said non-flat surface is cylindrical.

4. The heater of claim 1, where said substrate further comprises a longitudinal slot running the entire length of said substrate.

5. The heater of claim 1, where said resistive layer further comprises at least one low-resistance conductive trace in electrical communication with the at least one resistive trace, thereby forming an optimized heating generating pattern.

6. The heater of claim 5, where said conductive trace includes a silk-screen conductive trace that is located on said dielectric layer.

7. The heater of claim 1, where said resistive layer trace includes a silk-screened resistive layer trace that is located on said dielectric layer.

8. The heater of claim 1, where said resistive layer includes a directly printed resistive layer that is located on said dielectric layer.

9. The heater of claim 2, where said connector housing further comprises a locking detent that engages a locating hole on said substrate.

10. The heater of claim 9, where said locking detent is selectably removable from said locating hole.

11. The heater of claim 9, where said detent and said locating hole are in a predetermined arrangement relative to said contacts, thereby ensuring electrical communication of said contacts to said contact pads when said detent engages said hole.

12. The heater of claim 2, where said connector housing further comprises a key for slidably engaging a longitudinal slot in said substrate, thereby aligning radially said contacts with said contact pads.

13. The heater of claim 2, where said connector housing includes ceramic material.

14. The heater of claim 1, where said substrate is a nozzle body.

15. The heater of claim 1, where said substrate is made from steel.

16. The heater of claim 1, where said dielectric layer has a dielectric strength between 1000 VAC to 1500 VAC and an insulation resistance of at least 100 mega-ohms.

17. The heater of claim 1, where said substrate and said dielectric layer and said resistive layer and said insulation layer have substantially the same coefficient of thermal expansion.

18. The heater of claim 17, where said substrate has a slightly lower coefficient of thermal expansion than said dielectric, resistive and insulation layer.

19. The heater of claim 1, where said resistive layer includes a photoformed resistive layer that is located on said dielectric layer.

20. The heater of claim 1, where said resistive layer includes a laser-formed resistive layer or an abrasive-etched resistive layer.

21. The heater of claim 2, where said contact includes gold plated steel.

22. An injection mold runner nozzle having a co-axially disposed cylindrical heater comprising:

a) a cylindrical, thermally conductive substrate having a smaller coefficient of thermal expansion than that of said nozzle, thereby causing said substrate to clamp onto said nozzle as said nozzle and said substrate heat up;

b) a dielectric layer applied on said substrate;

c) a resistive layer applied on said dielectric layer thereby forming an electrical circuit for heat generation, the resistive layer having at least one resistive trace made of thick film ink in a pattern that is discontinuous circumferentially around the substrate;

d) at least a pair of contact pads applied in electrical communication with said resistive layer for electrical connection to a power source;

e) an insulation layer applied over said resistive layer and f) wherein the cylindrical, thermally conductive substrate has a thermal coefficient of expansion substantially the same or slightly lower than the dielectric and resistive layers.

23. The nozzle of claim 22, wherein the heater further comprises an annular connector housing that slidably engages said substrate for mechanical connection of a contact to each of said contact pads.

24. A thick-film electric heater, comprising:

a) a thermally conductive non-flat substrate surface;

b) a dielectric layer applied on said substrate surface;

c) a resistive layer applied on said dielectric layer thereby forming a circuit for the generation of heat, the resistive layer having at least one resistive trace made of thick film ink in a pattern that is discontinuous circumferentially;

d) at least a pair of contact pads applied in electrical communication with said resistive layer for electrical connection to a power source;

e) an insulation layer applied over said resistive layer; and f) wherein the thermally conductive non-flat substrate surface has a thermal coefficient of expansion substantially the same or slightly lower than the dielectric and resistive layers.

25. The heater of claim 24, where said at least one resistive trace is a plurality of traces configured to optimize an axial thermal profile of the heater.

* * * * *